Patented Apr. 28, 1936

UNITED STATES PATENT OFFICE 2,039,063

POLYKETO FATTY ACID BODY

Melvin De Groote, St. Louis, and Bernhard Keiser and Arthur F. Wirtel, Webster Groves, Mo., assignors to Tretolite Company, Webster Groves, Mo., a corporation of Missouri No Drawing. Original application December 31, 1934, Serial No. 760,031. Divided and this application November 14, 1935, Serial No. 49,762

4 Claims. (Cl. 87—12)

This invention relates to a new composition of matter, the present application being a division of our pending application Serial No. 760,031, filed December 31, 1934.

The object of our invention is to provide a new material, composition of matter, or chemical compound, consisting of a polyketo fatty acid body in the form of an acid, a salt, or an ester, that is capable of various industrial uses, but particularly adapted for use as a treating agent or a demulsifying agent in the resolution of petroleum emulsions of the water-in-oil type, and also as a plasticizer in the manufacture of artificial leather and similar plastics.

A preferred form of said new material, composition of matter, or chemical compound, which may be properly described as a polymerized keto-fatty body, is obtained by pressure-oxidation of castor oil bodies. Since the commercial development of the present invention resides largely in those materials derived by pressure oxidation, it appears desirable to emphasize this most important angle. The material or materials employed as raw materials in the pressure oxidation process used to produce our new compound or substance may be castor oil, ricinoleic acid, poly-ricinoleic acid, and other materials containing the characteristic ricinoleic acid radical.

It is immaterial whether the fatty body to be oxidized be a fatty acid, or an ester, or a mixture of the two. The final product is the result of oxidation, that is, treatment with an oxidizing agent in which oxygen has been added or hydrogen removed, by the conversion of an hydroxyl radical attached to a carbon atom into a carbonyl radical. Acids having the carbonyl group present are referred to as ketonic acids, or keto acids, insofar that the carbonyl radical is characteristic of ketones.

Insofar that conventional blown oils are produced by oxidation, we will indicate their general character and method of manufacture, in order to emphasize wherein the method of manufacture, employed in the present invention, is different.

The manufacture of conventional blown oils is a well known procedure that can be conducted in a relatively simple manner. Generally, the selected oil or fatty acid or mixture is heated to some suitable temperature, for instance, 150° to 200° C., and is subjected to the action of air or oxygen with a rising temperature, in most instances, of approximately 25° to 100° C., the oxidation being continued until there results a heavy bodied oil of high viscosity, and high specific gravity, which is of oily consistency and free from any semi-livery property. Blown oils produced by the conventional procedure above described are readily available in the open market, and are used primarily in the manufacture of lubricants or as plasticizers. In producing such blown oils a temperature of 250° C. is an average temperature for the ultimate oxidation, and if air is employed, the oxidation process may be completed in 15 to 20 hours under average conditions. The temperature and time required for oxidation depends upon the oils being oxidized, and also depends upon the length of time employed, as well as on the particular mass of oil being oxidized. Peculiarly enough, the same oil in a 10,000 lb. batch oxidizes somewhat differently from the same oil in a 500 lb. batch. Air with its natural moisture content is preferable for oxidation, but dry air may be used in practicing our process.

In our co-pending application for patent Serial No. 752,718, filed November 12, 1934, we have described a new process for producing blown oils, characterized by the fact that there is added to the oils to be blown, prior to the oxidation step, a relatively small amount of a vegetable oil of the true drying type, such as linseed oil, and there may or may not be added an esterifying catalyst of the Twitchell reagent type, such as oil-soluble petroleum sulfonic acids, frequently sold in the trade as Petroff reagents. As stated in our said application, we have found that a true drying oil, as differentiated from non-drying oils or semi-drying oils, when added in a relatively small amount, serves to catalyze the reaction involving the adsorption of oxygen. True drying oils are lected from the class including linseed oil, perilla oil, tung oil, etc. One may use a so-called artificially boiled, or quickly boiled linseed oil, which is essentially a raw linseed oil, with small amounts of added metallic driers of the kind used in the paint industry.

The oxidation of true drying oils, as characterized in the drying of paint or in the manufacture of linoleum, is not fully understood. Such oils are not adaptable for use in the manufacture of blown oils. It is believed by some authorities that the drying of oils of the linseed oil type occurs in two steps. The first step is the formation of a peroxide type of compound, which then enters into a second step, which is the actual oxidation of the true drying oils. Possibly, such peroxides, if formed during the manufacture of our new material or compound, are equally effective in promoting the rapid oxidation of the accompanying fatty body not derived from the drying oil group. Whether this is true or not as an explanation of the catalytic action of relatively insignificant amounts of true drying oil, we have found that the production of blown oils can be hastened and that blown oils can be produced more economically and of a better quality if there be added to the oils before blowing, a relatively small amount of a drying oil, being usually about three to five percent of the total oil to be oxidized, and in no instance more than ten percent, and in some instances, as little as one to two percent may be sufficient. Such drying oil may be of the commercial type, which has small amounts, generally less than 3%, of added drier, such as manganese linoleate, cobalt resinate, etc., all of which is disclosed completely in our said aforementioned application for patent.

Furthermore, as stated in the said application, we have not only found it possible to add a catalyst which effectively hastens the absorption of oxygen previously referred to, but we have also found it possible to hasten the esterification step, which appears to be part of conventional oxidation. Reference is made to U. S. Patent No. 844,426, to Ernst Twitchell, dated February 19, 1907, in which there is described the use of a sulfoaromatic fatty acid as a catalyst in hastening the reaction between castor oil and stearic acid. We have found that sulfo-aromatic fatty acids effectively hasten the esterification step, which is part of the reactions involved in the production of blown oil. Therefore, in addition to adding a relatively small amount of a true drying oil or acid thereof to reactive fatty bodies of the non-drying or semi-drying type, prior to a blowing process, we may also add, a relatively small amount of a suitable sulfonic acid, such as a sulfo-aromatic sulfonic acid. The amount added is relatively small, usually from one to three percent, and the sulfo body is usually added in the form of a free acid.

The sulfo-aromatic fatty acid described in the aforementioned Twitchell patent has been used for the splitting (saponification) of fats, so as to yield fatty acids and glycerine. Other sulfonic acids have been found suitable for this same purpose, such as sulfo-fatty acids, petroleum sulfo acids, certain alkylated aromatic sulfonic acids, cetyl sulfonic acids, reagents derived by sulfonation of hydrogenated castor oil and aromatic materials, etc. All these materials are sulfonic acids of large molecular weight, and are characterized by their ability to hydrolyze or split (saponify) glycerides in presence of steam. Their use in this art is well known. For the sake of convenience, we will herein refer to this class of sulfonic acids which we may employ as catalysts, as fat splitting sulfonic acids. We have found that the most desirable one to use is the oil-soluble sulfonic acid produced as a by-product in the manufacture of white medicinal oil and the like. These oil-soluble petroleum sulfonic acids exhibit some water-solubility also. They are often referred to as mahogany acids. In pure state, they are characterized by relatively light color, and we have found that a relatively small amount is sufficient to catalyze the esterification reaction previously referred to. This preferred type of fat splitting sulfonic acid, i. e., an oil-soluble petroleum sulfonic acid, is known as a Petroff reagent.

We have discovered that if we conduct the aforementioned process described in our said copending application, under somewhat different conditions, in the presence of or absence of a Twitchell reagent, we obtain a new type of polymerized oxidized oil characterized by the presence of ketonic acids. We have found that if we mix a true drying oil with a hydroxylated, unsaturated, fatty body, such as castor oil, in the proportion of approximately 1 part or less of linseed oil to 10 parts of castor oil and then blow the same with air under pressure of approximately 1 to 6 atmospheres, at or near the boiling point of water, but in any event, below the temperature range ultimately employed for producing ordinary oxidized oils, (or even below the temperature suggested in our said co-pending application, i. e., at a temperature under 135° C.), we can obtain a new type of polymerized blown oil which is characterized by the presence of 1 or more ketone radicals. We will characterize this blown oil as being pressure-oxidized at sub-normal temperatures, in the presence of a semi-drying oil, and further characterized by the presence of polyketonic fatty acids or their esters or salts.

The method of conducting the oxidation to produce the new type of oxidized material, i. e., keto poly acids or esters, is relatively simple. Any ricinoleic acid material may be used, such as ricinoleic acid, castor oil, poly ricinoleic acid, etc. Oxidation is conducted in any convenient vessel adapted for simultaneous oxidation under pressure, together with the application of heat and cooling water or brine, if required. Apparatus of the kind used in the hydrogenation of fats and oils may be employed. Such hydrogenation apparatus sometimes contains an agitator for keeping an insoluble catalyst in suspension. Such agitator is not required in the apparatus employed for producing our new type of oxidized oil, that is, keto poly acids, but may be present, if desired. The apparatus employed should have means for heating the oil to a temperature of approximately 135° C.; it should be equipped with jets for injecting air or oxygen in relatively small bubbles into the oil to be oxidized; and it should be large enough to allow for foaming and frothing. The air jets should be connected with an air compressor through an adjustable valve, so that the pressure of the air entering the vessel may be controlled within the limits of 15 to 75 lbs., or thereabouts. Needless to say, the apparatus must be built sturdily enough to withstand such pressures. The air leaving the apparatus should pass through a control relief valve which permits the air to escape at substantially the same pressure as it enters so that the entire oxidation is conducted under a predetermined pressure of the range previously indicated.

Where the product is to be used as a plasticizer and where a light color is desirable, the apparatus should be constructed of a non-corrosive material, such as enameled metal, a suitable nickel or nickel chromium alloy metal, an iron silicon alloy, or any other suitable construction. As previously stated, the drying oil employed may be linseed oil, perilla oil, the fatty acids thereof, or mixtures of the same, or any similar product. The drying oil may be of the commercial type, sometimes referred to as boiled linseed oil, which contains a small amount, generally less than three percent, of an added drier, such as manganese linoleate, cobalt resinate, etc. The amount employed may vary from about 2½% to 10% by weight of the oil or fatty bodies to be processed. The esterifying catalyst, which may be added in a relatively small amount, such as 2½% by weight, may be of the Petroff type, previously referred to, or a sulfo-aromatic fatty acid of the Twitchell type, or other similar materials, such as certain alkylated aromatic sulfonic acids, cetyl sulfonic acids, reagents derived by sulfonation of hydrogenated castor oil and aromatic materials, etc. All of said materials are well known as catalysts in the hydrolysis or saponification of glycerides. For the sake of convenience, as previously stated, we prefer to refer to this class of sulfonic acids as "fat splitting sulfonic acids".

The method that we prefer to use for producing our new material, composition of matter or compound, is substantially as follows: Approximately 4,000 lbs. of castor oil are placed in a vessel of a convenient kind equipped with a suitable means for heating same to approximately 135° C. Approximately 400 lbs. of linseed oil of either the boiled or the unboiled type are added. 40 lbs. of less of Petroff reagent are added. The vessel should be constructed in the manner previously described. After addition of the linseed oil and frequently without the addition of any fat splitting catalyst, steam is turned on, in the outer jacket, and the contents heated to approximately 120° C. It is noted that there is no objection to heating the contents above 135° C., but it is particularly desirable to permit the temperature to drop to the predetermined temperature or approximately 5° above the predetermined temperature, before oxidation starts. For instance, if oxidation is to take place at 120° C., it is desirable to raise the temperature to approximately 125° C., so that the first rush of cold air (i. e., air at ordinary temperature) will not cool the mass perceptibly below the desired temperature of initial oxidation, i. e., 120° C. Similarly, if oxidation is to take place at 130° C., the mass may be raised to 135° C. Of course, if the air to be used for oxidation is heated beforehand, there is no need for this slight increased temperature prior to oxidation.

In any event, after the desired temperature is reached, all openings are closed, the intake and outlet relief valves are set for the desired pressure (for instance, 45 lbs.) and oxidation started slowly and the temperature controlled so that oxidation takes place at whatever temperature has been predetermined, that is, 120° C., or possibly even 105° C., or even a trifle under 100° C., particularly if the pressure is higher, such as 75 lbs. or thereabouts. As a precautionary measure, the apparatus should be equipped with a jacket so that steam can be shut off at any time and cold water used to circulate throughout the jacket, because in case of a rise in temperature, it may be necessary to shut off the air and also to cool the mass.

The time required for oxidation varies from approximately 10 hours to approximately 30 hours, depending upon the size of the batch, percentage of added linseed oil, or equivalent, which may be as little as 2½% or less of the castor oil or similar material by weight, etc. Time of oxidation also depends on the temperature employed, the size of the batch, the pressure employed, the nature of the fatty materials, whether or not the oxidation vessel contains an agitator, etc. Other factors include the rate of the flow of air through the apparatus, the efficiency of the jets in breaking the air into small bubbles, possibly the moisture content of the air which may be absolutely dry or which may contain moisture, whether or not the air is preheated, etc. When the reaction has been carried far enough, we prefer to determine the amount of carboxylic hydrogen and to add just enough triethanolamine to neutralize the same, and to mix thoroughly.

The products obtained by such oxidation under pressure at sub-normal oxidation temperatures are characterized by a light color, a heavy viscosity, and the presence of ketonic poly fatty acids. We have found products manufactured in the above described manner to have present a significant amount of ketonic poly acids not present in similar bodies obtained by oxidation at the usual higher temperatures employed for the blowing of reactive oils. It is our belief that under the conditions described oxidation takes place at the alcoholiform hydroxyl, converting the CHOH group into a CO group. We believe that this reaction does not take place at higher temperatures, such as 140° C. or higher.

The formation of ketonic fatty poly acids under these conditions is indicated by the presence of bodies which react with the reagents commonly employed to indicate the presence of ketones. The agents commonly employed for this purpose are hydroxylamine, phenylhydrazine and semi-carbazide. This formation of ketonic acids or their esters, in the cautious oxidation of castor oil, for example, is consistent with what one would expect by analogy to the hydrogenation of castor oil. It is well known that in the hydrogenation of castor oil one may substantially destroy the hydroxyl without completely saturating the ethylene linkage, or that one may hydrogenate so as to saturate the ethylene linkage and not destroy the hydroxyl. Similarly, one may conduct hydrogenation so as to affect both the hydroxyl and the ethylene linkage. Ordinarily, oxidation of fatty bodies, including castor oil, results in an increased acetyl number, and presumably without destruction of the hydroxyl, or at least, if destroyed, it is not converted into a ketone, but possibly into an aldehyde, such as heptoic aldehyde by fissure of the molecule.

Southcombe, "Chemistry of the Oil Industries," 2nd edition, 1926, page 181, in speaking of oxidized oils, states:

"As with the polymerized and boiled oils, the exact nature of the change is unknown. Hydroxyl groups are unquestionably formed, as the considerable rise in acetyl value proves."

With the above facts in mind, one will recall that castor oil may be considered as an alcohol, and in that sense it may be considered as a disubstituted carbinol, that is, castor oil or ricinoleic acid may be looked upon not only as an alcohol, but as a secondary alcohol because the alcoholic hydroxyl is attached to a CH group. As stated by Bernthsen "Text Book of Organic Chemistry", 1931 edition, page 233:

"Ketonic acids are produced by the cautious oxidation of hydroxy acids containing the secondary alcoholic group:

$$CH_3.CH(OH).CO.OH+O=CH.CO.CO.OH—H_2O$$
Lactic acid  Pyroracemic acid"

Similarly, cautious oxidation of castor oil or ricinoleic acid in absence of oxidation at the ethylene linkage should result in a compound of the following compositions:

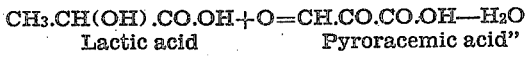

However, assuming that oxidation takes place simultaneously at the ethylene linkage, one would obtain a body of the following type:

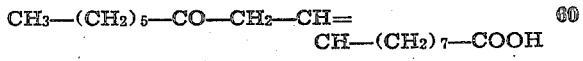

As far as keto fatty acids derived from castor oil are concerned, whether they be of the saturated or unsaturated type, one may characterize them by the following formula:

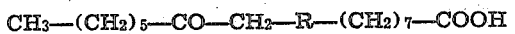

in which R represents either the grouping:

or the grouping:

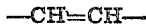

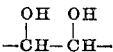

For the sake of convenience, such keto acids may be characterized by having the following acyl radical:

$(CH_3—(CH_2)_5—CO—CH_2—R—(CH_2)_7—CO)$ or the acid radical:

$(CH_3—(CH_2)_5—CO—CH_2—R—(CH_2)_7—COO)$

If such keto acid reacts with the hydroxylated fatty acid OH.T.COOH (in which T represents the ricinoleic or keto-ricinoleic fatty acid chain) by means of the carboxylic hydrogen of the keto acid, then the polyketo acid thus formed is of the type:

$(CH_3—(CH_2)_5—CO—CH_2—$
$R—(CH_2)_7—COO.TCOOH)$

However, polyketo acids may be formed through the agency of the carboxylic hydrogen of the acid OH.TCOOH, or an acid of the type T.COOH, both of which are derived from castor oil. In this particular instance, the reaction takes place with the grouping:

so that one obtains a material of the type in which there is a reaction between the acid hydrogen of the acid containing the T radical and the hydroxyl of the keto acid of the hydroxylated type, so as to give a material of the type in which R may be the grouping:

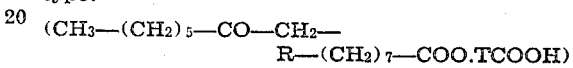

Thus, the polyketo acids may be characterized by the presence of the same organic acid radical as the simple unpolymerized keto acids, with the additional qualification that R may not only represent the grouping:

—CH=CH— or the grouping:

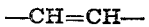

but also either the grouping:

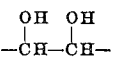

or the grouping:

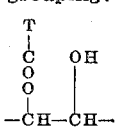

In any case, where there is an acidic hydrogen present such as a hydrogen of the carboxyl, obviously such hydrogen can be represented by any convenient substitute, such as a metallic atom, an ammonium radical, or an organic radical, etc.

It is also likely that some oxidized materials free from the carbonyl group are formed. As is well known, oxidation of reactive fatty acids and their glycerides produces complex poly acids of various kinds. In the event that keto fatty acids are present, as in the present instance, the poly acids which are formed are poly keto fatty acids, as has been previously indicated. Therefore, it must be borne in mind that the keto fatty acids present in the composition of our present application are not in the form of an unpolymerized keto fatty acid, such, for example, as keto-hydroxystearic acid, subsequently referred to, but represents polymerized or poly molecular keto acids, such as keto oleyl ricinoleic acid, subsequently referred to. Thus, it happens that the carbonyl radical is attached, not to a single ordinary fatty molecule or residue, but perhaps to a poly acid formed from the combination of two fatty radicals, or even more.

For this reason it is possible that the true amount of poly ketonic acids or their glycerides which are formed, may not always make their presence known in the manner that one would expect of low molecular weight ketones, or low molecular weight ketonic acids. The majority of ordinary ketones, of course, are of low molecular weight, and this is also true of the ordinary ketonic acids, such as aceto-acetic acid. However, if one forms the ketonic acid above described, which still contains the ethylene linkage, and which we will refer to as keto-oleic acid, and if such keto-oleic acid were combined with a mole of ricinoleic acid by reaction of the carboxylic hydrogen of the keto-oleic acid with an hydroxyl of ricinoleic acid, then one might have a compound which could be referred to as keto-oleyl ricinoleic acid, and in this particular instance one has the carbonyl group in a molecule whose molecular weight approximates 575 and is water-insoluble. Similarly, reaction with castor oil would produce keto-oleyl tri-ricinoleic, with a molecular weight of about 1200.

It is our belief that the majority of material present, or at least, a large proportion, represents a poly acid of the kind in which a keto acid supplies part of the complex poly acid molecule derived from at least two fatty molecules. This belief is based in part on an examination of the products obtained by combining keto-hydroxystearic acid with the ricinoleic acid and ricinolein. The method of producing the keto-hydroxystearic acid is well known (see Lewkowitsch, "Chemical Technology of Oils, Fats and Waxes", 6th edition, volume 1, page 240). If keto-hydroxystearic acid thus prepared, is heated with ricinoleic acid, or with diricinoleic acid, one obtains a large molecular weight of keto-fatty acid which is characterized by the presence of the ketone radical, i. e., the carbonyl radical. Similarly, if keto-hydroxystearic acid is heated with one mole of triricinolein, combination takes place and there is formed a fatty body, to wit, a glyceride of high molecular weight (approximately 1200), in which there is present a ketone or carbonyl radical. The materials so obtained, i. e., the polymerization product of keto-hydroxystearic acid and certain hydroxylated fatty bodies, such as ricinoleic acid, or diricinoleic acid, or triricinoleic acid, or ricinolein, yield materials which appear to be comparable to those obtained by the pressure oxidation at subnormal temperatures of unsaturated hydroxylated fatty materials, as described in the present invention. We have not been successful in obtaining similar products by the oxidation of saturated, hydroxylated, fatty materials, such as hydroxystearic acid, although they should be obtainable because the oxidation of the secondary alcohol group should not be dependent upon the presence of an ethylene linkage elsewhere. Nevertheless, our experience has been that oxidation takes place, as far as the method described by us goes, particularly in regard to castor oil materials of the kind described, which incidentally are available at lower prices than hydroxystearic acid.

It is true that the production of keto-hydroxystearic acid or the like and conversion into polyketo acids yields a product which represents substantially 100% polyketo acids, whereas, the pressure oxidation method yields materials which contain a majority of a significant amount of keto poly acids, but does not necessarily yield a product containing as much as 85% to 100% polyketo acid bodies. However, the materials accompanying polyketo acids obtained by the pressure oxidation process, are not objectionable and are akin to ordinary blown oil, and thus are suitable for the same purpose for which polyketo acids or their salts or esters are employed. Therefore, as a matter of convenience, and as a matter of economy, we prefer to use a somewhat impure form of polyketo acid bodies obtained by the pressure oxidation process.

We are fully aware that migration may take place in a fatty molecule. For instance, that the formation of stearolactone from hydroxystearic acid appears to depend upon the migration of the alcoholiform hydroxyl. We are also aware that in the case of the common ketonic acid, aceto-acetic acid, that certain reactions are known to take place which suggest that aceto-acetic acid may, as far as some reactions are concerned, react more as an aldehyde or as an aldehydic acid, than as a ketonic acid. Such wandering of a hydrogen atom and change in position of a double bond is referred to as keto-enolic tautomerism (Bernthsen, v. s. 231). We believe that this or a comparable change may take place in these poly ketonic acids previously described, and possibly, in regard to some reactions, these polyketo acids or esters thereof act more as if they were aldehydic acids or esters thereof. In other words, if these poly ketonic acids are to be used in a mixture where aldehydic acids would be incompatible, it is also likely that these poly ketonic acids or their esters may be incompatible, for the reason that they really may be aldehydic acids. It is to be noted that the reactions above described for determining the presence of the carbonyl group in ketones also detect the presence of a carbonyl group in aldehydes. It is to be understood that in the claims where the products are characterized by the presence of ketonic acids, that such acids might ultimately prove to be aldehydic acids, or at least convertible under certain conditions of use or certain conditions of identification into aldehydic acids, and it is not intended that the word "ketonic" be interpreted as excluding the meaning of "aldehydic" in the sense previously described or discussed.

It is understood, of course, that these polymerized ketonic acids or their esters may be converted into salts or esters in the manner generally employed for the manufacture of salts or esters. However, it should be borne in mind that saponification of the kind which would decompose the polymerized material into its simpler form in the same manner that diricinolein could be decomposed into two molecules of ricinoleic acid, is objectionable and cannot be employed. Due to the low cost of castor oil, it so happens that the products commercially produced will be derived from esters as raw materials and that the amount of free acidic material, after pressure oxidation, is relatively low. In such instances, where it is desirable to eliminate this residual acidity, it is best accomplished by means of a relatively weak base, such as triethanolamine, as in the case of the preferred example, previously referred to. In some instances, it might be desirable to mix an alcohol, particularly a polyhydric alcohol, such as glycerol or ethylene glycol, with the pressure oxidized body or bodies and then heat so as to eliminate the carboxylic hydrogen. In any event, the polymerized ketonic body or bodies may be converted into any suitable form by means of conventional reactions, provided the material is not decomposed so as to destroy the carbonyl radical or the polymerized state, and thus produce simple ketonic fatty acids, as differentiated from poly ketonic acids in the same manner as ricinoleic acid is differentiated from diricinoleic acid.

We are aware that castor oil or castor oil bodies, such as ricinoleic acid, has been treated in various manners, so as to produce poly acids, such as diricinoleic, triricinoleic, etc. Such poly acids, of course, are not ketonic in nature, and do not represent poly ketonic acids of the kind described in the present application. We are also aware, as previously stated, in regard to Lewkowitsch, that it is possible to produce keto fatty acids, for instance, keto-hydroxystearic acid, in various manners. It would be possible to take a keto fatty acid, whether derived from castor oil or not, and react it in such a manner as to produce a polyketo fatty acid. As far as we know, it has been broadly new to produce polyketo fatty acids of the kind herein described. It, of course, has been old to oxidize the castor oil under conditions of relatively drastic oxidation. Various materials could be so produced. However, the present materials are the kind obtained under conditions of mild and controlled oxidation, which yields keto acids, and particularly of the kind, which, under the conditions described, forms polyketo acid bodies. We are not aware of any other available process which will produce the same materials as herein described.

Having thus described our invention, what we claim as new and desire to secure by Letters Patent is:

1. A composition of matter, consisting of a polyketo fatty acid body, characterized by an acid radical of the following formula type:

in which R represents the grouping:

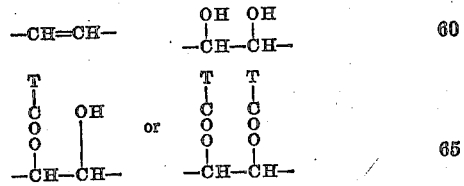

and T characterizes a fatty acid radical, said fatty acid body including the radical T and being further characterized by being derived from castor oil, by means of pressure oxidation in presence of a small amount of a true drying oil.

2. A composition of matter, consisting of a polyketo fatty acid body in the form of an acid, characterized by an acid radical of the following formula type:

$$(CH_3-(CH_2)_5-CO-CH_2-R-(CH_2)_7-COO)$$

in which R represents the grouping:

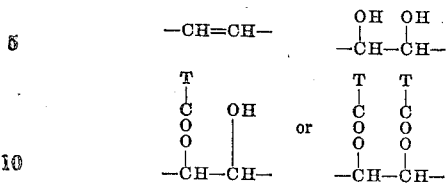

and T represents a fatty acid radical, said fatty acid body including the radical T and being further characterized by being derived from castor oil by means of pressure oxidation in presence of a small amount of a true drying oil.

3. A composition of matter, consisting of a polyketo fatty acid body in the form of a salt, characterized by an acid radical of the following formula type:

$$(CH_3-(CH_2)_5-CO-CH_2-R-(CH_2)_7-COO)$$

in which R represents the grouping:

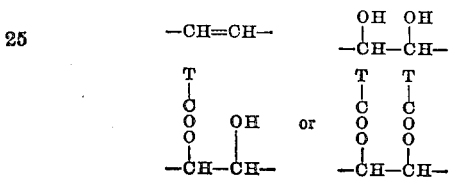

and T represents a fatty acid radical, said fatty acid body including the radical T and being further characterized by being derived from castor oil by means of pressure oxidation in presence of a small amount of a true drying oil.

4. A composition of matter, consisting of a polyketo fatty acid body in the form of a salt, characterized by an acid radical of the following formula type:

$$(CH_3-(CH_2)_5-CO-CH_2-R-(CH_2)_7-COO)$$

in which R represents the grouping:

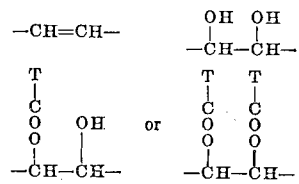

and T represents a fatty acid radical, said fatty acid body including the radical T and being further characterized by being derived from castor oil by means of pressure oxidation in presence of a small amount of a true drying oil.

MELVIN DE GROOTE.
BERNHARD KEISER.
ARTHUR F. WIRTEL.